United States Patent [19]

MacDonald et al.

[11] Patent Number: 4,936,389

[45] Date of Patent: Jun. 26, 1990

[54] FLUID DISPENSER FOR AN AIRCRAFT

[75] Inventors: Alan B. MacDonald; Lawrence J. Neuwirth, both of Paradise, Calif.

[73] Assignee: Aero Union Corporation, Chico, Calif.

[21] Appl. No.: 220,863

[22] Filed: Jul. 18, 1988

[51] Int. Cl.[5] .................... A62C 3/02; A62C 28/00; B64D 1/16

[52] U.S. Cl. .................................... 169/53; 169/47; 244/136; 137/398; 137/412; 222/67; 222/556

[58] Field of Search ................ 169/53, 47, 52, 70; 244/136; 239/171; 137/397, 398, 412; 222/67, 68, 502, 503, 556

[56] References Cited

U.S. PATENT DOCUMENTS

| | | | |
|---|---|---|---|
| 2,665,092 | 1/1954 | Sands | 244/136 |
| 3,423,053 | 1/1969 | Hawkshaw | 244/136 |
| 3,661,211 | 5/1972 | Powers | 169/53 |
| 3,698,480 | 10/1972 | Newton | 169/53 X |
| 3,754,601 | 8/1973 | Linkewich | 169/53 X |
| 3,901,467 | 8/1975 | Hawkshaw | 169/53 X |

FOREIGN PATENT DOCUMENTS

| | | | |
|---|---|---|---|
| 709294 | 5/1965 | Canada | 169/53 |
| 1378856 | 3/1988 | U.S.S.R. | 169/53 |

*Primary Examiner*—Joseph F. Peters, Jr.
*Assistant Examiner*—James M. Kannofsky
*Attorney, Agent, or Firm*—Lothrop & West

[57] ABSTRACT

The momentary position, between open and closed, of a bottom door panel controlling release of fluid from an airborne container containing the fluid is governed by both the height of the fluid in the container and the instantaneous position of the door panel.

21 Claims, 8 Drawing Sheets

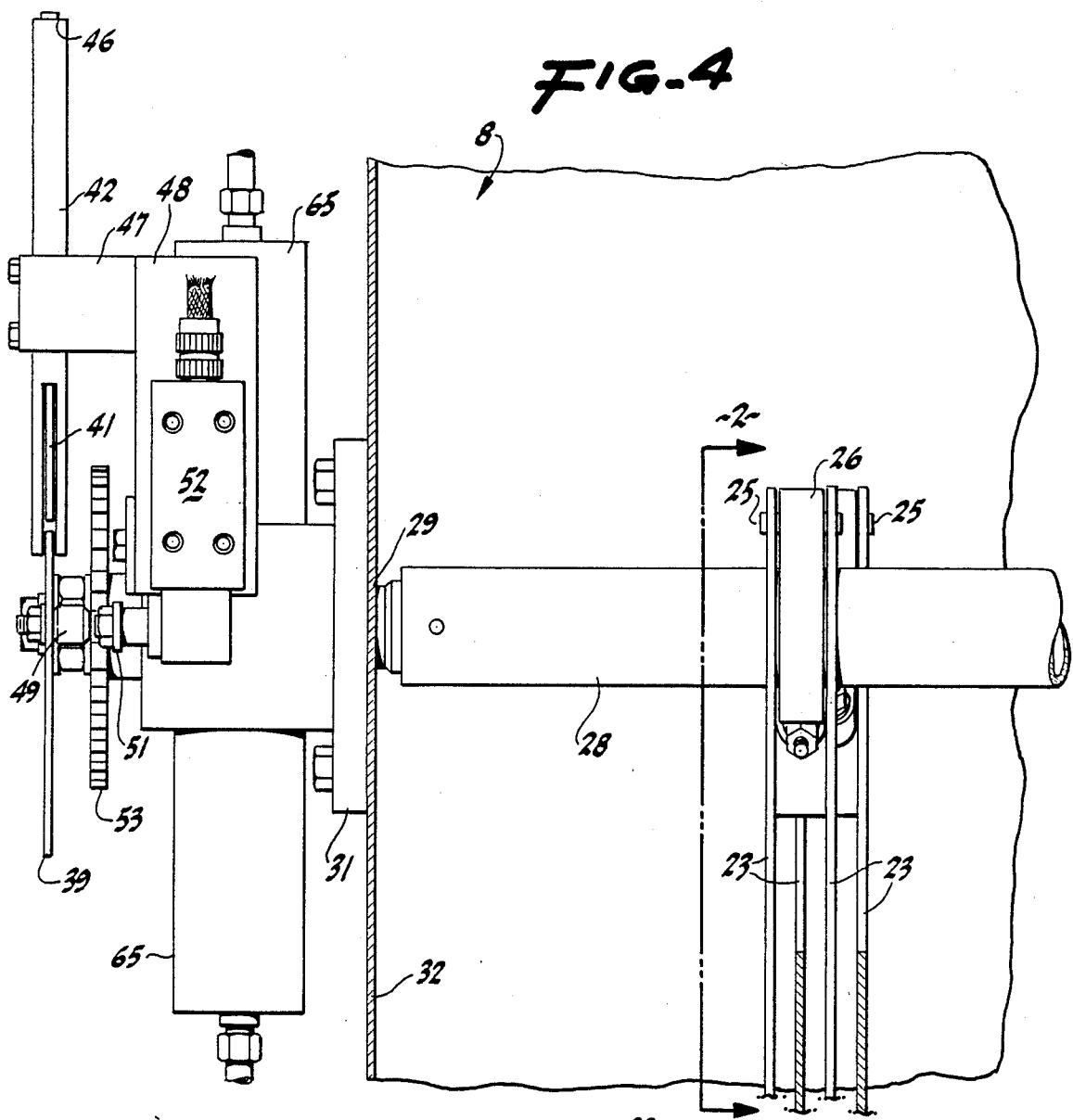
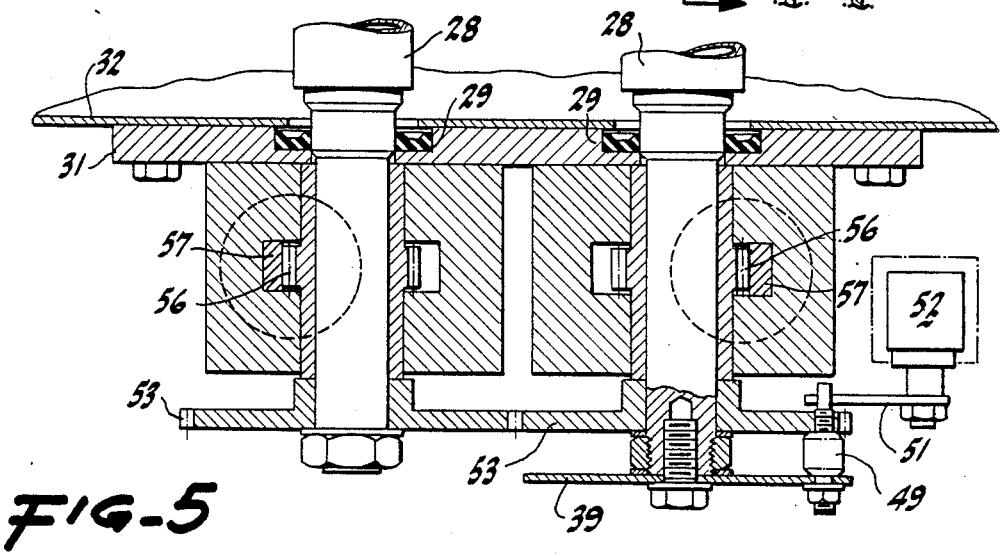

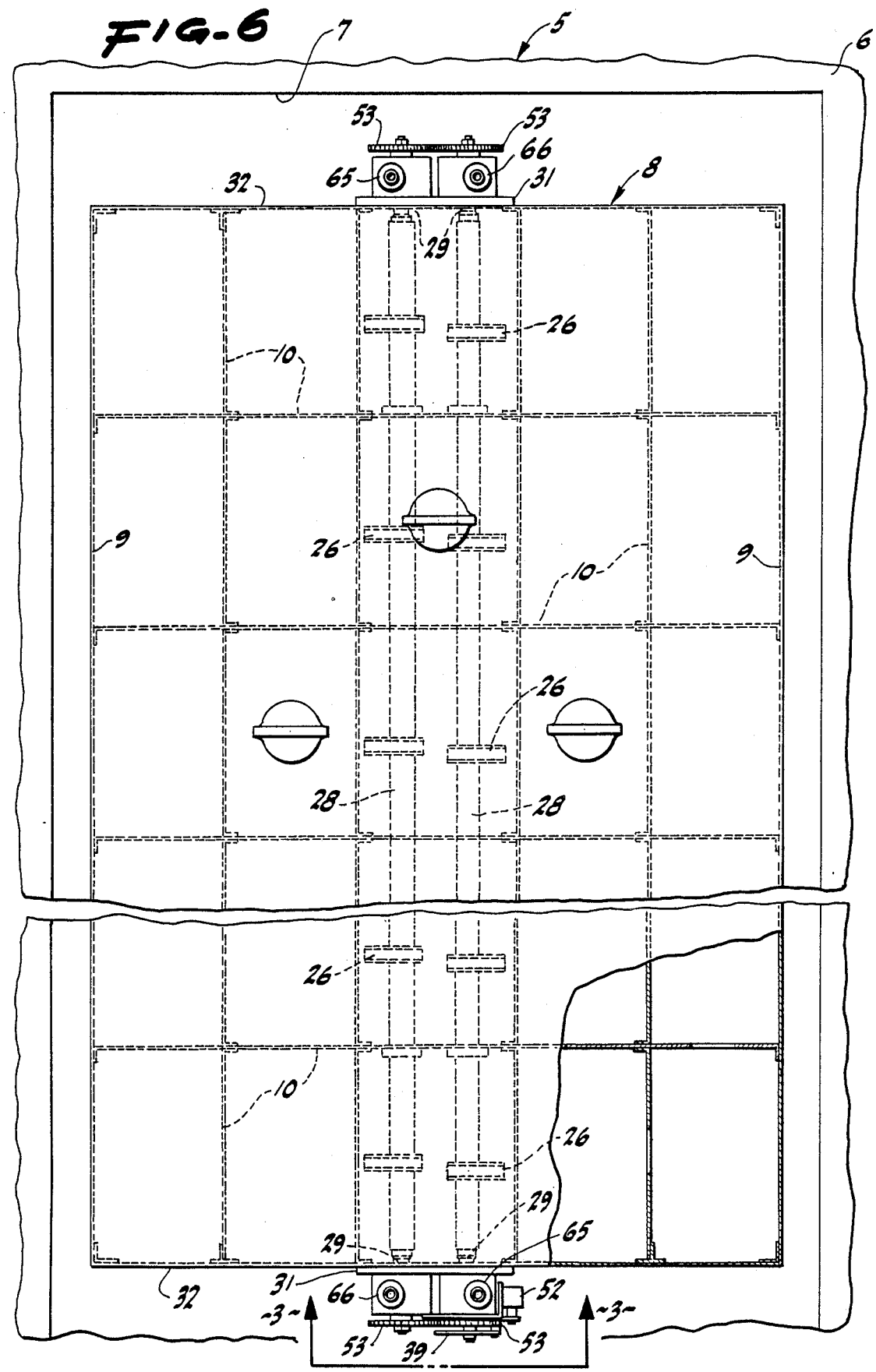

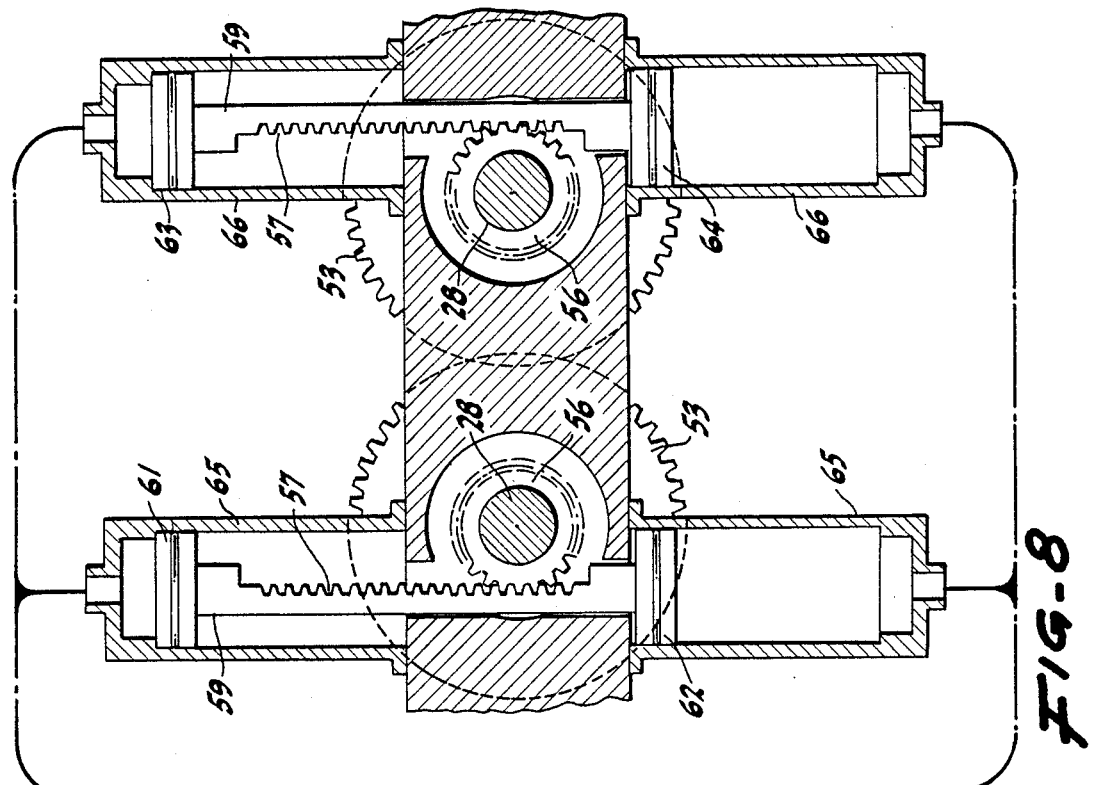
FIG-8
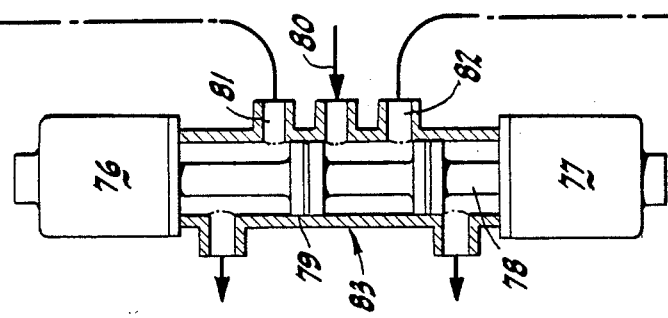
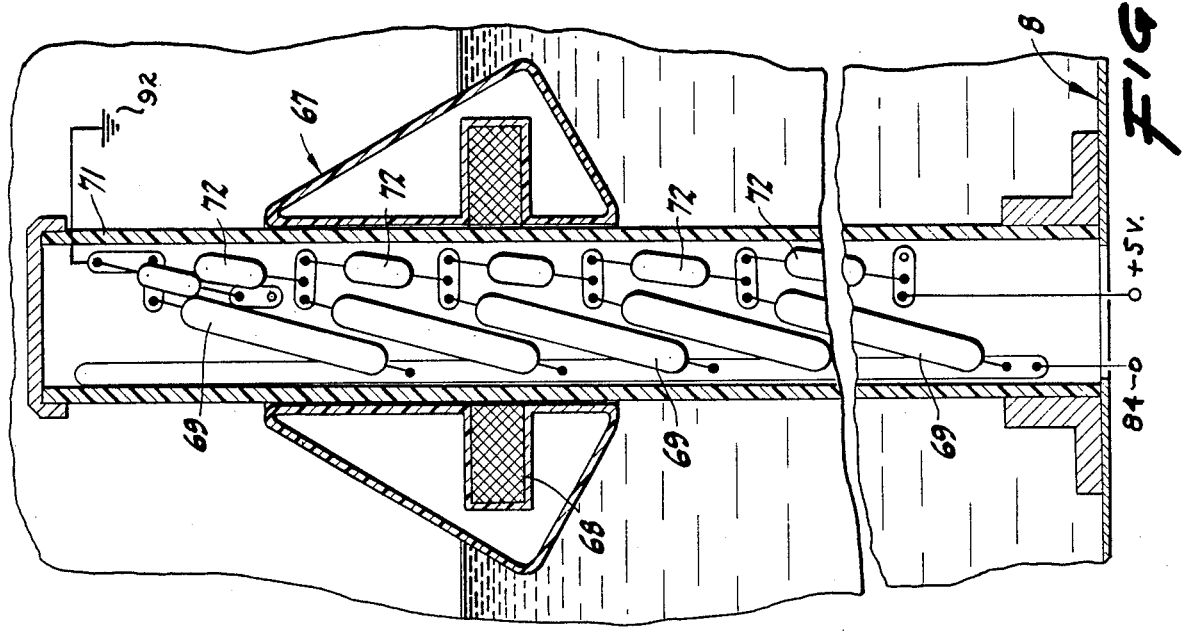
FIG-7

FLUID DISPENSER FOR AN AIRCRAFT

BACKGROUND OF THE INVENTION

1. Field Of The Invention

This development relates to aircraft equipped and operated to carry and dump, under control, a load of water, or other fire-retardant, onto a forest fire beneath.

2. Description Of The Related Art

Current firefighting airplanes carry a load of fire-retardant that is dumped, without control, onto a subjacent fire.

SUMMARY OF THE INVENTION

An aircraft fuselage adapted to hold fluid, fire-retardant material includes a bottom door panel movable between a closed position and an open position. The door panel movement is regulated, under pilot control, by electrical and electronic means in accordance with the height of fluid occupying the fuse-lage of the aircraft and conjointly with the momentary location of the door panel between open position and closed position.

BRIEF DESCRIPTION OF THE DRAWINGS

FIG. 4 is a cross-section on the line 4—4 of FIG. 3, showing in side elevation and in section a portion of the structure illustrated in FIG. 3.

FIG. 5 is a cross-section, the plane of which is indicated by the line 5—5 in FIG. 3.

FIG. 6 is a plan on a horizontal, longitudinal plane showing some of the construction of the fluid tank, a part being broken away to reduce the size of the figure, and another part being broken away to disclose the interior construction.

FIG. 7 is a cross-sectional view of one form of a fluid level sensing mechanism.

FIG. 8 is a cross-sectional view of an electrohydraulic actuator.

DESCRIPTION OF THE PREFERRED EMBODIMENT

In supervising and controlling extensive tracts of land, such as prairies and forests, ground vehicles are not always adequate and resort has been had in recent times to the use of aircraft for various purposes. One of the major purposes is to deposit fire-retardant on a prairie or forest to douse a fire. Another use is to seed extensive areas. There are further uses requiring the large-scale deposit of liquid or fluid materials (such as discrete seeds) onto the ground below. One of the problems has been that it is simple to dump an entire planeload of seeds or fluid onto the subjacent terrain, but that does not usually accomplish the intended purpose. For example, in firefighting it is desirable to distribute the fire-retardant in a carefully controlled drop over a carefully regulated and defined area. Similarly, in area seeding it is essential that the seeds be deposited in accordance with a predetermined or predesigned pattern to afford uniform and desired results.

It is therefore an object of the invention to provide a structure useful with an aircraft for controlling or regulating the discharge from tanks or containers on the aircraft of fluid materials to cover the terrain below in a predetermined fashion.

Another object of the invention is to provide such a structure that can readily and easily be accommodated in the aircraft type normally utilized for such work.

A further object of the invention is to provide such an arrangement that does not require a great deal of operator or pilot control but, once started, is virtually automatic in its functioning.

Another object of the invention is in general to provide a practical and useful arrangement for controlling in accordance with a predetermined design the release of fluid material such as water or seeds from a flying aircraft onto the subjacent ground.

A further object of the invention is to provide electrical and electronic control means to operate the functioning parts of the drop mechanism after the initial closure of a switch by the operator.

These and other objects of the invention are attained in the embodiment of the invention disclosed in the accompanying drawings and described herein.

Figure 1:
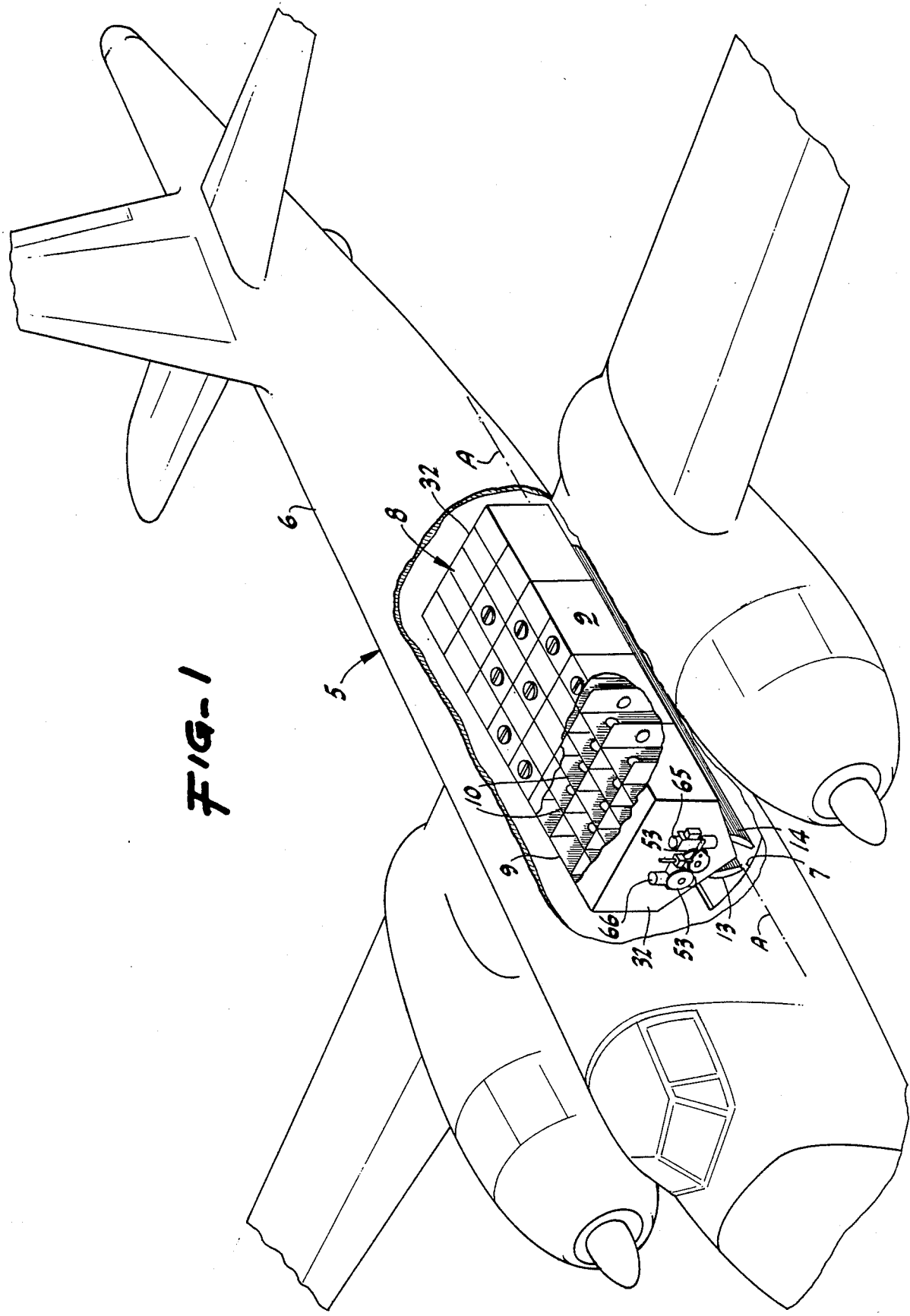
FIG. 1 is an isometric view of an aircraft suitable for use in connection with the invention, parts of the aircraft being broken away to disclose interior construction.
Figure 2:
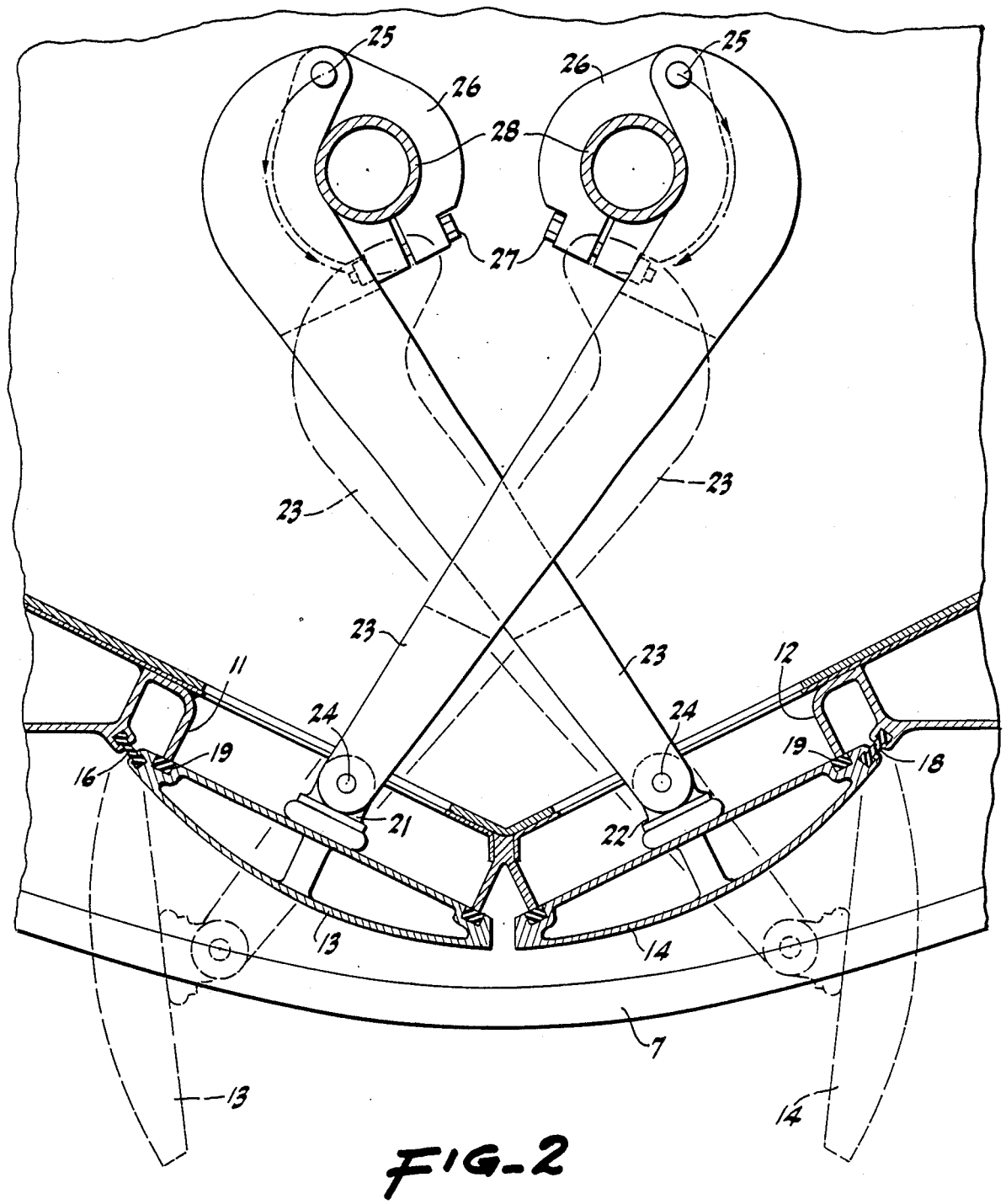
FIG. 2 is a cross-section, the plane of which is indicated by the line 2—2 of FIG. 4, and showing the parts moving the door panels between closed and open position.

In a typical instance there is provided a generally standard aircraft 5 having the customary fuselage 6 of which a large part is left vacant or defines a central, bottom opening 7. Fast in the fuselage is a rectangular tank 8 having suitable enclosing walls 9, having baffle walls 10 with openings, and sometimes having an interior lining, not shown. The 25 aircraft 5 has a longitudinal axis A—A (FIG. 1) about which a pair of tank bottom openings 11 and 12 (FIG. 2) are symmetrical. These openings leave a central well and extend for only a part of the total length of the fuselage. Controlling the openings 11 and 12 are individual, longitudinally extending tank door panels 13 and 14 conveniently of double-wall construction. The door panels 13 and 14 are related to the tank openings by hinge strips 16 and 18 disposed along one edge of each of the openings. Because of their flexibility, the strips serve not only as supporting hinges for the panels, but also as seals to prevent leakage through the hinge structure. Each of the door panels 13 and 14 also has a peripheral gasket 19 (FIG. 2) designed, when the panels are closed, to serve as a sealing device to preclude outflow or leakage.

The panels 13 and 14, being hinged, are appropriately moved between their extreme closed and open positions by a lever structure. Each panel has a plurality of multiple plate lugs 21 and 22. At one end a group of links 23 has a pivot connection 24 to the lugs and at the other end is somewhat curved or J-shaped to engage a respective pivot pin 25 on a respective lever arm 26. Clamp bolts 27 secure the arms 26 to a respective one of a pair of longitudinally or axially extending tubes 28 carried in journals 29 (FIG. 4). In turn, the journals are mounted on supporting plates 31 at each tank end. These are fastened to the end tank walls 32 extending transversely of the fuselage 6 and join the tank side walls 9. A large amount of fluid can be retained without sloshing or undue movement as the aircraft flies.

Figure 3:
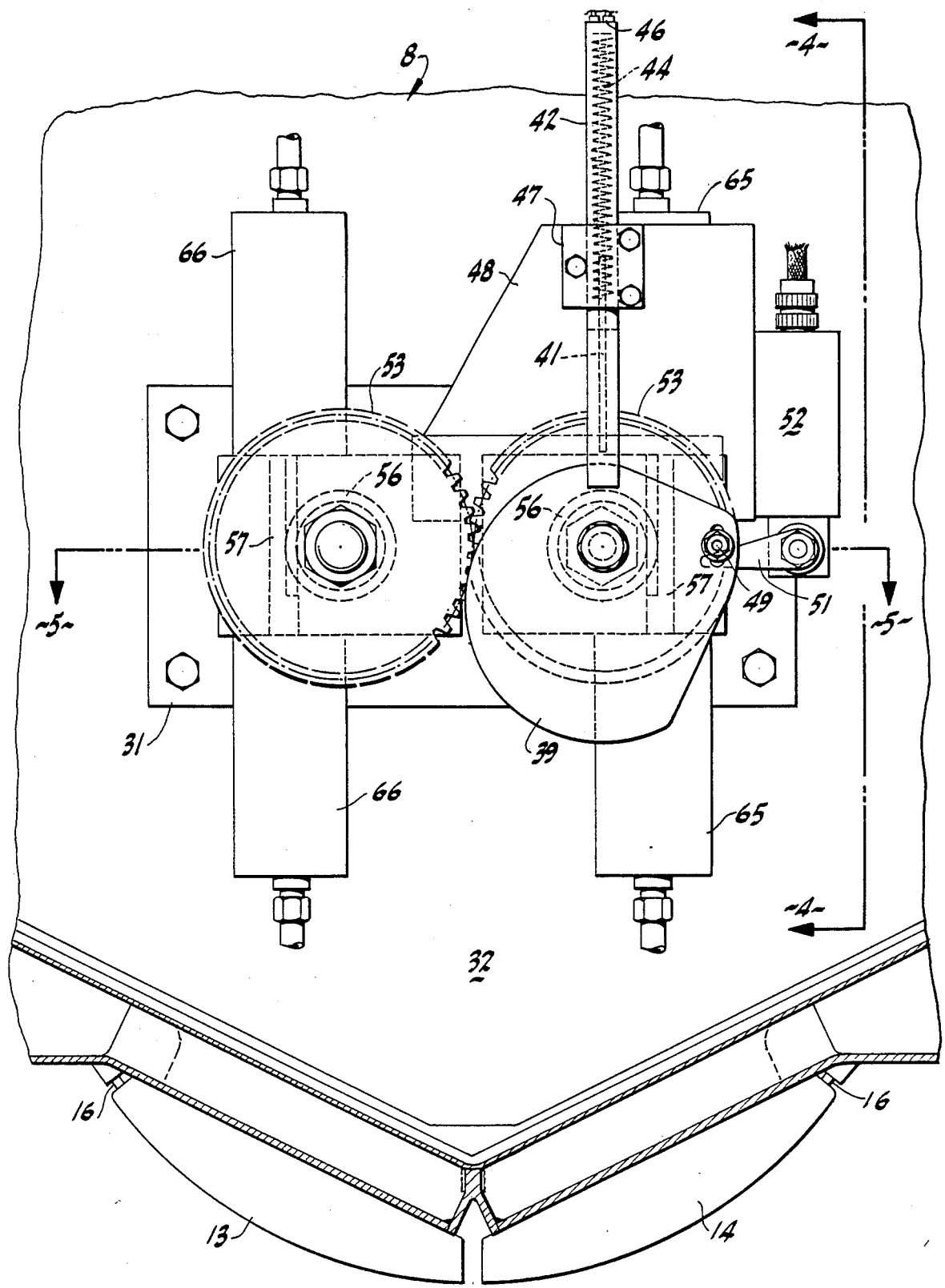
FIG. 3 is a partial cross-section to an enlarged scale, the plane of section being indicated by the line 3—3 of FIG. 6.

One of the tubes 28 at one end is provided with a cam 39 (FIG. 3) adapted to engage a potentiometer plunger 41 in a tube 42. A potentiometer coil 44 in the tube is engaged by the plunger 41 and varies a connected electrical circuit, later described. The plunger 41 abuts a stop 46 in the top of the tube 42. A clamp 47 on a bracket 48 holds the tube 42. A pin 49 is adjustably clamped on the cam 39 and actuates a lever 51 operating a limit electrical switch 52. The coil 44 and the switch 52 indicate the intermediate and extreme positions of the tank panels 13 and 14.

At their ends, the tubes 28 (FIGS. 3 and 5) carry gears 53 in mesh so that the tubes and their connecting mechanisms all operate in unison. The tube ends also carry gears 56 meshing with racks 57 on piston rods 59 joined to pistons 61 and 62 in one cylinder 65 and pistons 63 and 64 in the other cylinder 66. Since the cylinders 65 and 66 are connected to valving in appropriate hydraulic pressure circuits, the panels 13 and 14 can be controlled as desired by the aircraft pilot or operator manipulating the proper hydraulic valving. Thus, the panels can be opened an eighth, or a quarter, or a half, or any other fraction or all of their entire opening. See FIG. 8.

The level of liquid in the tank 8 is sensed by a float 67 (FIG. 7) in the tank and rising and falling with the liquid level therein. The float 67 has a magnet 68 operating on a vertical series of magnetically responsive switches 69 arranged in an inert tube 71 inside of the tank. The switches are connected in electrical series and are successively actuated as the liquid level rises and falls. The switches 69 are alternatives to the rotary multi-contact switches shown in the circuit diagram and make small or incremental changes in the number of resistors 72 included at any one time in a responsive electrical circuit.

Control of the fire-retardant drop hydraulic system is effected through energization of either an opening solenoid 76 (FIG. 8) or a closing solenoid 77 acting on a rod 78 effective through a hydraulic valve core 79 to direct fluid from a pressure source 80 through either one of two ports 81 and 82 in a hydraulic controller 83.

Figure 9A:
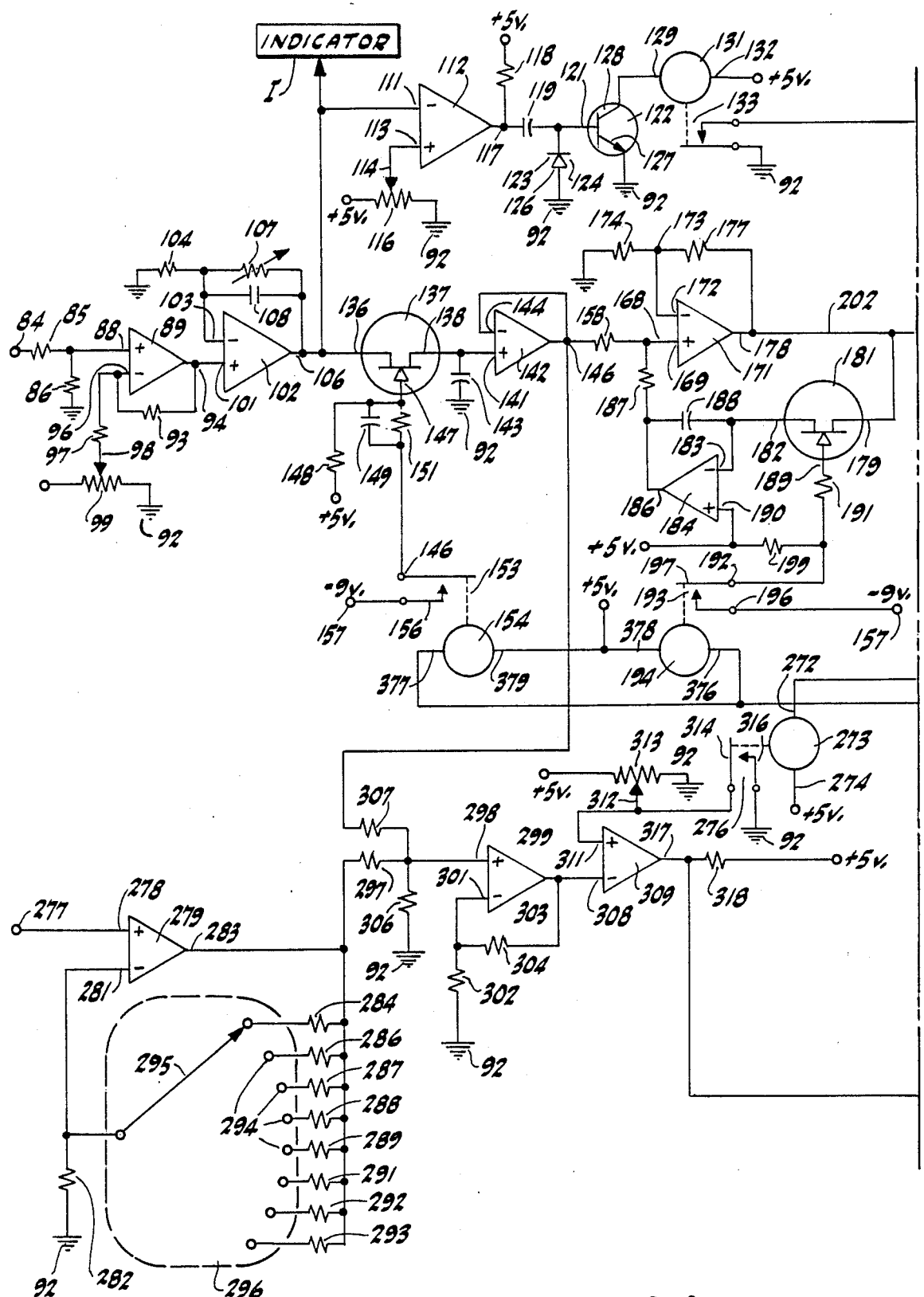
FIG. 9A is a diagram of the left-hand part of the electrical circuit concerned with the door panel operation.

Whether the opening solenoid 76 or the closing solenoid 77 is actuated is determined by electrical control signals received between circuit common (ground) and a terminal 84 for variable signals (FIG. 9A). One form of signal is a varying d.c. voltage proportional to the quantity or level of fire-retardant in the tank 8. This d.c. voltage varies from a low value for an empty tank to a high value for a full tank. As it appears at the terminal 84, the voltage is reduced by a factor of two through voltage dividing resistors 85 and 86. A center tap between the resistors goes to the positive input terminal 88 of an amplifier 89. The terminal of the resistors goes to circuit common 92. The amplifier 89 is an operational amplifier, a solid state device, an example of which is the commercial unit produced by the National Semiconductor Corporation as model LM358A. A feedback resistor 93 is connected between the output terminal 94 of the amplifier 89 and the negative input terminal 96 of the amplifier 89. Another resistor 97 is connected between the negative terminal 96 of the amplifier 89 and a wiper arm 98 of a potentiometer 99 connected at one end to a source of plus five volts and connected at the other end to circuit common 92.

The resistors 93 and 97 form a set to determine the gain through the amplifier 89. In this embodiment, the voltage gain is unity between the input terminal 96 and the output terminal 94. Adjustment of the position of the potentiometer wiper arm 98 sets the output voltage at the terminal 94 to be exactly zero when the tank 8 is empty.

The output terminal 94 is connected to the positive input terminal 101 of a second operational amplifier 102. Connected between the negative input terminal 103 of the amplifier 102 and circuit common is a resistor 104. Connected between the output terminal 106 of the amplifier 102 and the negative input terminal 103 is a variable resistor 107, and shunting the variable resistor 107 is a capacitor 108 ensuring operational stability of the amplifier 102. The variable resistor 107 and the fixed resistor 104 form a gain setting pair for the amplifier 102. The voltage appearing at the output terminal 106 is established at plus five volts by adjustment of the variable resistor 107 when the fire-retardant tank 8 is full. The voltage at the output terminal 106 is zero when the fire-retardant tank level is zero and is plus five volts when the fire-retardant tank level is maximum.

The output voltage at the terminal 106 is conducted to a negative input terminal 111 of a comparator module 112. A positive terminal 113 of the comparator module 112 is connected to the wiper arm 114 of a potentiometer 116. One end of the potentiometer 116 is connected to the plus five volt source. The other end of the potentiometer 116 is connected to the circuit common 92. The action of the comparator module 112 is to keep an output terminal 117 at ground or common potential as long as the voltage at the negative input terminal 111 exceeds the voltage at the positive terminal 113. When the voltage at the terminal 111 falls below the voltage at the positive terminal 113, the output voltage at the terminal 117 is released from ground and will go to a voltage determined by external circuit components.

In this embodiment, a resistor 118 is connected between the source of plus five volts and the output terminal 117. A capacitor 119 is connected between the output terminal 117 and a base input terminal 121 of a transistor 122. Also connected to the base input terminal 121 is the cathode 123 of a diode 124. The anode 126 of the diode 124 is connected to circuit common 92. The transistor 122 has its emitter 127 connected to circuit common 92 and has its collector 128 connected to one terminal 129 of a relay 131. The other terminal 132 of the relay 131 is connected to the positive five volt source.

When the output terminal 117 of the comparator 112 is held at ground potential, current through the resistor 118 flows totally through the circuit of the comparator 112. When the output terminal 117 is released from ground potential, current flow through the resistor 118 is through the capacitor 119 and thence through the base emitter junction 121 of the transistor 122. This current flow turns the transistor 122 "on" and energizes the coil of the relay 131. The transistor 122 will stay on as long as current flows through its base emitter junction 121, and that current flow will continue long enough to bring the capacitor 119 to a full charge.

The diode 124 serves to discharge the capacitor 119 when the comparator 112 has the output terminal 117 clamped at ground potential. In this embodiment, the voltage at the terminal 113 of the comparator 112 is set by adjusting the wiper 114 on the potentiometer 116 to represent a fifty-gallon level in the fire-retardant tank.

Thus, the relay 131 will be energized when the voltage level at the negative input terminal 111 decreases to the point of being slightly less than the voltage at the terminal 113. As long as the coil of the relay 131 is energized, the associated contact set 133 will be closed, thus effecting, in conjunction with other circuit elements to be described later, a continued opening of the fire-retardant tank doors so as to drop any remaining liquid from the tank.

A second connection is made to the output terminal 106 of the amplifier 102 and drains the terminal 136 of a field effect transistor 137. A source terminal 138 of the field effect transistor 137 is connected to the positive input terminal 141 of an operational amplifier 142. A capacitor 143 is connected from the terminal 141 to circuit common 92. A negative input terminal 144 of the amplifier 142 is connected to an amplifier output terminal 146. The amplifier 142 is of the same kind as the amplifiers 89 and 102. The amplifier 142 is configured as a voltage follower; that is, an amplifier with a gain of one and a high input impedance.

Connection is made from the gate electrode 147 to a field effect transistor 137 joined through a series resistor 148 to the positive five volt source. Further transistor connection to the gate electrode 147 is made through a capacitor 149 and series resistor 151 to the terminal 146 of a contact set 153 associated with a relay 154. The other terminal 156 of the contact set 153 goes to a negative nine volt bus 157. Bias voltage for the field effect transistor 137 is set by the appropriate proportioning of resistors 151 and 148 such that with the relay contact 153 open, the voltage at the gate electrode of the field effect transistor 137 is positive, and the field effect transistor conducts as a closed circuit switch. Voltage appearing at the terminal 136 of the field effect transistor 137 then is conveyed through an amplifier 142 to an output terminal 146. In addition, the capacitor 143 has voltage across it equal to the voltage appearing at the terminals 136 and 146.

Closure of the contact set 153 of a relay 154 applies a negative bias voltage to the field effect transistor 137, turning it off. The transistor 137 will remain in the "off" state for an amount of time required for a capacitor 149 to charge from its initial zero value to a voltage determined by the appropriate proportioning of resistors 151 and 148. Such voltage is, in the absence of the capacitor 149, sufficient to maintain the transistor 137 in the "on" state. When the transistor 137 is in the "off" state, voltage appearing at the terminal is then exactly the voltage appearing across the capacitor 143 and has no relationship to any voltage appearing at the terminal. Thus, the combination of the transistor 137, the capacitor 143 and the amplifier 142 in conjunction with the appropriate biasing circuits just described constitutes a sample and hold circuit effective, in this embodiment, for about two hundred milliseconds following the closure of the contact set 153 of the relay 154.

Also connected to the output terminal 106 of the amplifier 102 is a suitable indicator I for showing the liquid level in the fire-retardant tank.

A first output connection 168 from the terminal 146 of the amplifier 142 is made through a resistor 158 to a positive input terminal 169 of an operational amplifier 171. The amplifier 171 is of the same variety as the previously described operational amplifiers. The negative input terminal 172 of the amplifier 171 has a first connection 173 through a resistor 174 to circuit common 92. A second connection from the input terminal 172 is through a connection 173 and a resistor 177 to an output terminal 178. A second connection from the output terminal 178 is made to a drain electrode 179 of a field effect transistor 181. A source electrode 182 of the field effect transistor 181 is connected to a negative input terminal 183 of an operational amplifier 184. The amplifier 184 is of the same variety as described previously. An output terminal 186 of the amplifier 184 is connected through a resistor 187 to the input terminal 169 of the amplifier 171. Also connected between the negative input terminal 183 of the amplifier 184 and the output terminal 186 of the amplifier 184 is a smoothing capacitor 188. The positive input terminal 190 of the amplifier 184 is connected directly to the plus five volt bus. The field effect transistor 181 has a gate electrode 189 connected through a resistor 191 to a first terminal 192 of a normally open contact set 193 actuated by a relay 194. A second terminal 196 of the contact set 193 is connected to the minus nine volt bus 157. A second connection 197 is made to a first terminal 198 of the contact set 193 through a resistor 199 to the positive five volt bus.

When the relay contact set 193 is in its normally open position, a bias is applied to the field effect transistor 181 to cause it to conduct, thus closing a negative feedback loop encompassing the amplifiers 171 and 184 and including a smoothing capacitor 188. The effect of the closed feedback loop is to cause voltage at the output terminal 178 of the amplifier 171 to remain constant, in this case at plus five volts. When the contact set 193 is closed, a negative bias is applied to the gate electrode 189 of the field effect transistor 181 opening the feedback loop and freeing the voltage at the output terminal 178 to be other than the voltage set at the terminal of the amplifier 184. Voltage changes at the terminal 178 will follow exactly any voltage changes appearing at the terminal 146 of the amplifier 142. These voltage changes start from the plus five volt level at the terminal 178.

An output conductor 202 extends from the terminal 178 directly to an input terminal 203 of a comparator 204. This comparator is like the comparator 112. A positive input terminal 206 of the comparator 204 is connected to a rotor 207 of a selector switch 208. A first terminal 209 of the selector switch 208 is connected to the midpoint of a voltage divider constituted by resistors 211 and 212 connected between the plus five volt bus and the circuit common 92. A second terminal 213 of the switch 208 is similarly connected to the midpoint of a voltage divider constituted by resistors 214 and 216 connected between the plus five volt supply and the circuit common 92. In a like fashion, a third terminal 217 of the selector switch 208 is connected to a voltage divider combination of resistors 218 and 219 disposed between the plus five volt bus and the circuit common 92. A fourth terminal 221 of the selector switch 208 has a conductor 222 connected directly to circuit common 92. An output terminal 223 of the comparator 204 is connected by a resistor 224 to the positive five volt bus. A second output connection 226 is made from a terminal 223 of the comparator 204 through a resistor 228 to a gate terminal 229 of a silicon-controlled rectifier 231. Connected between the gate terminal 229 and circuit common 92 is a parallel combination of a resistor 232 and a capacitor 233.

A connection is made to an anode terminal 234 of the silicon-controlled rectifier 231 from a first terminal 236 of a normally open contact set 237 as part of a plurality of contact sets of a relay 238. A second terminal 239 of the contact set 237 is connected to circuit common. Also connected to the anode terminal 234 of the silicon-controlled rectifier 231 is a first terminal 241 of a normally closed contact set 242, one of a plurality of contact sets associated with a relay 243. The second terminal 244 of the contact set 242 is connected to a first terminal 246 of a relay 247. A second terminal 248 of the relay 247 is connected to the five volt bus. A normally open contact set 249 of the relay 247 has a first terminal 251 connected to circuit common 92. A second terminal 252 of the contact set 249 is connected through a limit switch 253, associated with the mechanical position of the door panel, to a first terminal 254 of the closing solenoid 77. A second terminal 256 of the closing solenoid 77 is connected to a plus twenty-eight volt d.c. power bus 257. Connected between the terminals 254 and 256 is a suppression diode 258 having its anode 259 connected to the terminal 254 and its cathode 261 connected to the terminal 256.

Current will flow in the solenoid 77 if the door switch 253 is closed; that is, if the tank door panels are open, and the relay 247 is energized. The contact set 249 is then closed and completes the electrical circuit from the twenty-eight volt bus 257 to circuit common 92 through solenoid coil 77. The relay 247 is energized when both relays 238 and 243 are deenergized and a trigger pulse is supplied to the silicon-controlled rectifier 231. The silicon-controlled rectifier 231 has the ability to continue to carry current from anode to cathode following a trigger pulse. Thus a sustained circuit closure is made, although its initiation is but momentary.

A third connection to the output terminal 223 of the comparator 204 is made through a resistor 262 to a gate terminal 263 of a silicon-controlled rectifier 264. Connected between the gate terminal 263 and circuit common is a parallel combination of a stabilizing resistor 266 and a stabilizing capacitor 267. A cathode terminal 268 of the silicon-controlled rectifier 264 is connected to circuit common. The anode terminal 269 of the silicon-controlled rectifier 264 is connected through a normally open contact set 271, one of the plurality of contact sets of the relay 238, to a first terminal 272 of a relay 273. A second terminal 274 of the relay 273 is connected to the positive five volt bus. A normally open contact set 276 forms a part of the relay 273.

A voltage analog of the fire-retardant tank door position is introduced to a circuit terminal 277. This analog voltage ranges from a value of zero volts when the doors are closed to plus 3.63 volts when the doors are fully open. Connection is made from the terminal 277 to a positive input terminal 278 of an operational amplifier 279. This amplifier is another amplifier like the amplifier 89. A negative terminal 281 of the amplifier 279 is connected through a resistor 282 to circuit common. From the output terminal 283 of the amplifier 279 is connected a plurality of resistors 284, 286, 287, 288, 289, 291, 292 and 293, each to one of a plurality of selection terminals 294 of a selector switch 296. The rotor 295 of the selector switch 296 is connected to the negative input terminal 281 of the amplifier 279. Each of the resistors 284 through 293 in conjunction with the resistor 282 determines the corresponding gain of the amplifier 279. Thus, a voltage appearing at the terminal 277 will be modified and magnified at any one of the selection terminals in varying amounts depending on the position of the selector switch 296 and the values of each of the resistors 284 through 293, all of which are different and appropriately proportioned.

The output terminal 283 of the amplifier 279 is connected through a resistor 297 to the positive input terminal 298 of an operational amplifier 299. The negative input terminal 301 of the amplifier 299 is connected through a resistor 302 to circuit common. The output terminal 303 of the amplifier 299 is connected through a resistor 304 to a negative input terminal 301 of the amplifier 299. A second connection to the positive input terminal 298 of the operational amplifier 299 is made through a resistor 306 to circuit common. A further connection is made from the positive terminal 298 of the amplifier 299 through a resistor 307 to the terminal 146 of the amplifier 142.

Connection is made from the output terminal 303 of the amplifier 299 to a negative input terminal 308 of a comparator unit 309. A positive input terminal 311 of the comparator 309 is connected to a wiper terminal 312 of a potentiometer 313. One end of the potentiometer 313 is connected to the five volt bus, and the other end is connected to circuit common. Also connected to the wiper terminal 312 of the potentiometer 313 is a first terminal 314 of the contact set 276. A second terminal 316 of the contact set 276 is connected to circuit common. An output terminal 317 of the comparator 309 is connected through a resistor 318 to the five volt bus.

In addition, the output terminal 317 is connected to the base electrode 321 of a transistor 322. An emitter terminal 323 of the transistor 322 is connected to circuit common. The collector terminal 324 of the transistor 322 is connected to a first terminal 326 of a relay 327.

A second terminal 328 of the relay 327 is connected to the five volt bus. Normally, an open contact set 331 forms a part of the relay 327. One terminal 332 of the contact set 331 is connected to circuit common. A second terminal 333 of the contact set 331 is connected to a first terminal 334 of a contact set 336, one of a plurality of contacts forming part of a relay 238. Also connected to a second terminal 339 of the contact set 331 is a first terminal 341 of a normally open contact set 342, one of a plurality of contact sets forming a part of a relay 243. The second terminal 339 of a contact set 346 is connected to the second terminal of the contact set 336. In addition, the second terminal 339 of the contact set 342 is connected to a first terminal 347 of the opening solenoid 76. A second terminal 348 of the opening solenoid 76 is connected to the twenty-eight volt d.c. power source. Also connected across the terminals 347 and 348 is a suppression diode 351 having its anode 352 connected to the terminal 347 and its cathode 353 connected to the terminal 348.

A normally open push button 354 has two terminals 356 and 357 one of which is connected to circuit common. The other terminal 357 is connected to a first terminal 358 of a relay 238. A second terminal 359 of the relay 238 is connected to the plus twenty-eight volt power source. A first terminal 361 of a relay 243 is connected to the twenty-eight volt power source. A second terminal 362 of the relay 243 is connected to a first terminal 363 of a contact set 364, one of the plurality of contact sets forming part of the relay 243. The second terminal 366 of the contact set 364 is connected to the second terminal 367 of a normally open contact set 368, one of the plurality of contact sets forming part of the relay 238. The first terminal of the contact set 368 is connected to the first terminal of the contact set 364. Thus, the contact set 364 and the contact 368 are wired in parallel. Also connected to the first terminal of the contact sets 364 and 368 is the first terminal of the contact set 133, which is part of the relay 131. The second terminal of the contact set 133 is connected to circuit common.

A final, normally open contact set 372, part of the plurality of contact sets of the relay 238, has a first terminal 373 connected to circuit common. The second terminal 374 of the contact set 372 is connected to first terminals 376 and 377, respectively, of the relays 194 and 154. The second relay terminals 378 and 379 of the relays 194 and 154 are connected to the plus five volt bus.

The effect of the described circuits and their components is to place the moving parts of the liquid dumping mechanism under electrically responsive, fingertip control of the pilot or operator, thus leaving him free to fly the plane. A further result is to attain all of the stated objects of the invention in a workable, practical way.

The present device affords operation both in manual and incremental mode.

Figure 9B:
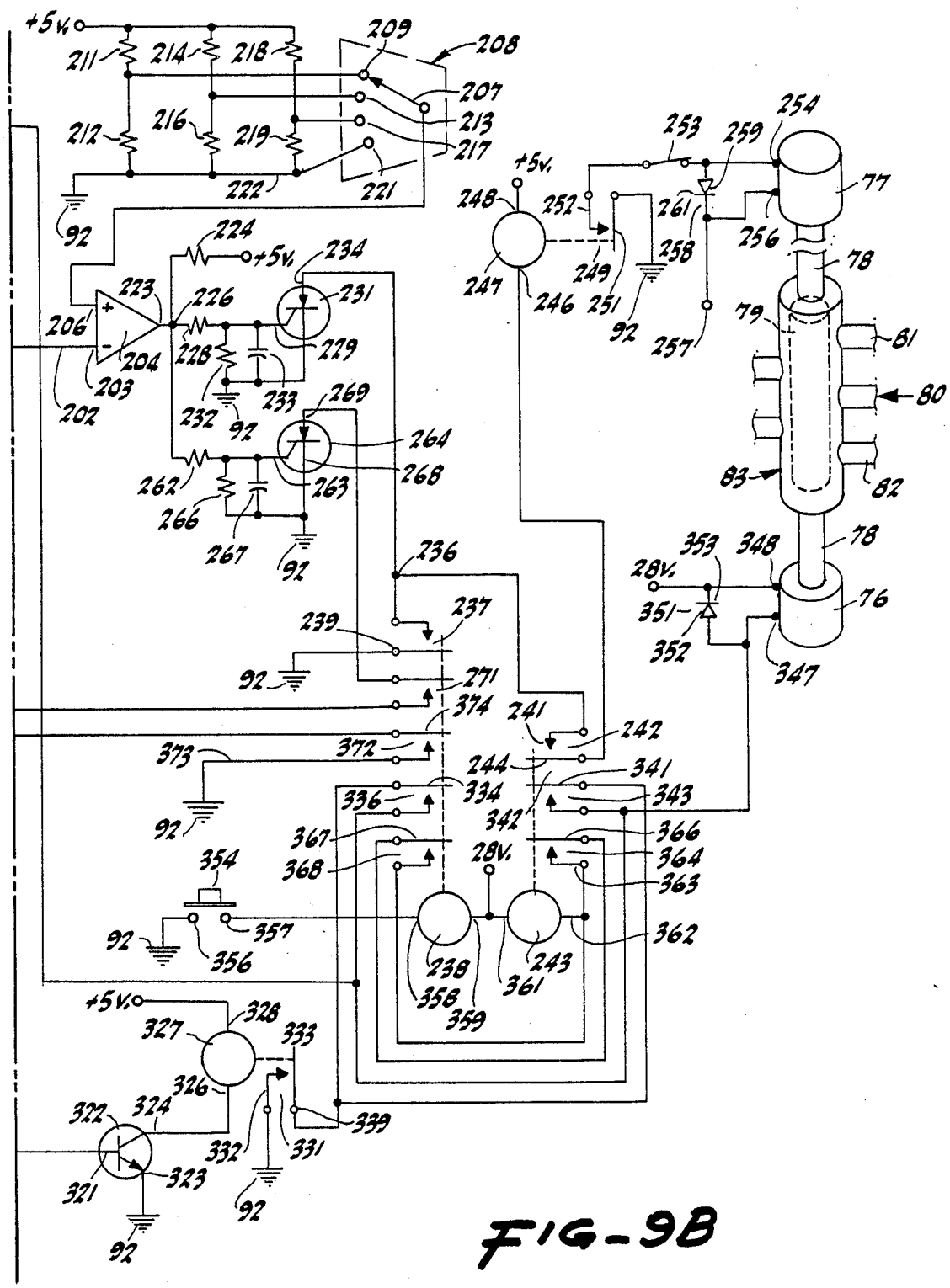
FIG. 9B is a diagram of the right-hand part of the electrical circuit concerned with the door panel operation.

For manual mode drops, the pilot of the aircraft selects the "All" position on the Incremental/Manual Control selector switch 208 (see the top left of FIG. 9B) and then selects the coverage level desired on the drop rate selector switch 296 (see the bottom left of FIG. 9A). In "All" position, the rotor 207 of the selector switch 208 contacts the terminal 221; and the desired coverage level is introduced into the system by appropriate positioning of the rotor 295 into contact with one of the plurality of terminals 294 of the selector switch 296. In this mode the drop control button 354 (see FIG. 9B) preferably located on the pilot's control yoke (not shown) is held down until the desired line length of retardant is dropped. The door panels 13 and 14 will be automatically closed by operation of the closing solenoid 77 when the drop control 354 is released unless the remaining amount of retardant is below a predetermined minimum quantity, in which case the doors stay open until the tank is empty. Remaining retardant will be displayed on a conventional annunciator panel bargraph.

For incremental mode drops, the pilot selects the desired increment by positioning the rotor 207 of the Incremental/Manual Control selector switch 208, or drop quantity selector switch, at the appropriate one of the terminals, namely, terminal 209 for ⅛, terminal 213 for ¼, terminal 217 for ½ and terminal 221 for "All". The desired coverage level is also introduced into the system in the manner previously described, i.e. by appropriate positioning of the rotor 295 of the selector switch 296. The incremental mode is used when a specific amount of retardant is to be dropped. When the drop control button 354 is pressed and held, the door panels 13 and 14 are opened by operation of the opening solenoid 76 and torque tubes 28 and the selected quantity is dropped. Releasing the drop control button 354 at any time will stop the drop. Pushing the botton again will dispense the original increment selected. If the button 354 is held down, the system will close the door panels 13 and 14 at the end of the selected drop even if the button is not released.

Cockpit presentations of system operations appear on an annunciator panel and include a bargraph for tank quantity and relative door position, along with status indicator screens and lights of various colors. These items are of a conventional nature and thus are neither shown nor described in detail.

In a typical installation, tank capacity is 2000 U.S. gallons, and the flow rate can be varied from 50 gallons per second to 700 gallons per second in eight flow rates and in tank capacity increments of ⅛, ¼, ½ and "All".

The ability to maintain a constant, predetermined rate of flow regardless of the amount of fluid remaining in the tank enhances the delivery of fire retardent from aircraft drop tank systems in that the patterns dropped will be consistently more uniform in width and coverage density than has heretofore been possible.

We claim:

1. A fluid dispenser for an aircraft having a longitudinal axis comprising a fluid container on said aircraft, a pair of doors forming the bottom of said fluid container, means extending parallel to said axis for hinging said doors on said container, means for moving said doors about said hinging means, means responsive to the head of fluid in said container, and means dependent upon said head responsive means for controlling said moving means.

2. A device as in claim 1 in which said head responsive means provides for substantially uniform discharge of said fluid from said container.

3. A device as in claim 1 in which said hinging means is impervious to said fluid.

4. A device as in claim 1 in which said moving means includes a shaft, means for journalling said shaft on said fluid container, a link, means for pivoting said link at one end to one of said doors, a crank on said shaft, and means for pivoting the other end of said link to said crank for movement of said link substantially into dead center position with respect to said crank.

5. A device as in claim 1 in which said moving means includes a linkage joined to one of said doors, said linkage occupying a substantially dead center position when said one of said doors occupies a substantially closed position relative to said fluid container.

6. A device as in claim 1 in which said fluid container substantially coincides with the configuration of a substantial portion of the fuselage of said aircraft, and means within said container for inhibiting longitudinal and lateral movement of fluid within said container.

7. A device as in claim 1 in which said fluid container is adapted to contain fluid at various levels, means responsive to the level of fluid in said container, and means responsive to said level responsive means for positioning said door moving means.

8. A device as in claim 7 in which said level responsive means includes a plurality of magnetically actuated switches, and a float in said fluid container effective to influence adjacent ones only of said switches.

9. A device as in claim 7 in which said level responsive means includes a plurality of magnetically actuated switches arranged in a vertical column, and a magnetic float adapted to be disposed in said fluid and to move vertically in a path individually to influence each of said switches.

10. A device as in claim 1 including means responsive to the position of said doors due to said hinging movement for controlling said means for moving said doors.

11. A device as in claim 1 including means responsive non-linearly to the position of at least one of said doors due to said hinging movement for controlling said means for moving said doors.

12. A device as in claim 1 including a substantially spiral cam, and a cam follower engaging said cam for controlling said means for moving said doors.

13. A device as in claim 1 including a pair of shafts, means for mounting said shafts for rotation, a first link connecting one of said shafts to a respective one of said doors, a second link connecting the other of said shafts to the other one of said doors, and means for connecting said shafts for rotation in unison.

14. A device as in claim 1 including a pair of shafts mounted for rotation, a first link connecting one of said shafts to a respective one of said doors, a second link connecting the other of said shafts to the other one of said doors, and meshing gears on said shafts for connecting said shafts for rotation in unison.

15. A device as in claim 1 including a pair of axial shafts, a first group of links spaced axially apart and connecting one of said shafts to one of said doors at intervals, and a second group of links spaced axially apart and interspersed with the links of said first group and connecting the other of said shafts to the other of said doors.

16. A fluid dispenser for an airplane fuselage comprising a fluid tank in said airplane fuselage, a panel forming part of said fuselage and movable between a first closed position blocking fluid flow from said tank and a second open position permitting fluid flow from said tank, and means depending upon the amount of fluid in said tank for controlling the location of said panel between said first position and said second position.

17. A fluid dispenser as in claim 16 in which said panel is adjacent said first closed position when said fluid tank is substantially full and said panel is adjacent said second, open position when said tank is substantially empty.

18. A fluid dispenser as in claim 16 in which said means depending upon the amount of fluid in said tank includes means responsive to the height of fluid in said tank.

19. A fluid dispenser as in claim 16 including a hydraulic jack for moving said panel, a charging hydraulic circuit, a discharging hydraulic circuit, a valve for connecting said jack selectively to said charging circuit and to said discharging circuit, and means for operating said valve in accordance with the height of fluid in said tank and the location of said panel between said closed position and said open position.

20. A fluid dispenser for an aircraft having a fuselage containing liquid and having a door movable between a position retaining said liquid and a position releasing said liquid comprising a solenoid for controlling said movable door, a switch controllable by the pilot of said aircraft for operating said solenoid, a series of magnetically responsive electric switches effective in sequence to control said solenoid, a float responsive to the level of said liquid for controlling said switches, and means for connecting in series said float controlled switches and said controllable by said pilot.

21. A fluid dispenser as in claim 20 in which said switch is effective upon momentary depression to actuate said solenoid and to keep said solenoid actuated for a predetermined period of time.

* * * * *